United States Patent
Grovenburg

(10) Patent No.: US 7,817,567 B2
(45) Date of Patent: Oct. 19, 2010

(54) TROUBLESHOOTING A SPECIFIC VOICE OVER INTERNET PROTOCOL (VOIP) TELEPHONE CALL TRANSMITTED OVER A COMMUNICATIONS NETWORK

(75) Inventor: William Grant Grovenburg, Monument, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1526 days.

(21) Appl. No.: 10/627,619

(22) Filed: Jul. 28, 2003

(65) Prior Publication Data

US 2005/0025063 A1    Feb. 3, 2005

(51) Int. Cl.
    H04J 1/16    (2006.01)
(52) U.S. Cl. ........................ 370/252; 709/224
(58) Field of Classification Search ......... 370/241–248, 370/250, 352–356, 252, 253, 389; 709/223, 709/224
    See application file for complete search history.

(56) References Cited

U.S. PATENT DOCUMENTS

| | | | | |
|---|---|---|---|---|
| 5,799,156 | A * | 8/1998 | Hogan et al. | 709/237 |
| 6,381,220 | B1 * | 4/2002 | Kung et al. | 370/250 |
| 6,839,323 | B1 * | 1/2005 | Foti | 370/235 |
| 7,173,911 | B1 * | 2/2007 | Sarkar et al. | 370/252 |
| 2002/0091832 | A1 * | 7/2002 | Low et al. | 709/227 |
| 2003/0072330 | A1 * | 4/2003 | Yang et al. | 370/493 |
| 2003/0200311 | A1 * | 10/2003 | Baum | 709/224 |
| 2003/0214913 | A1 * | 11/2003 | Kan et al. | 370/252 |
| 2004/0015582 | A1 * | 1/2004 | Pruthi | 709/224 |
| 2004/0037267 | A1 * | 2/2004 | Bennett et al. | 370/352 |
| 2004/0062204 | A1 * | 4/2004 | Bearden et al. | 370/250 |
| 2004/0071130 | A1 * | 4/2004 | Doerr et al. | 370/352 |
| 2004/0218743 | A1 * | 11/2004 | Hussain et al. | 379/201.11 |

FOREIGN PATENT DOCUMENTS

| | | | |
|---|---|---|---|
| JP | 2003046563 A | 2/2003 | |
| JP | 2003069644 A | 3/2003 | |

OTHER PUBLICATIONS

Product Information on Agilent J6844A Telephony Network Analyzer, 2 pages, Published on Agilent website prior to Jul. 28, 2003.
Product Information on Agilent J6781A Network Troubleshooting Center (NTC), 2 pages, Published on Agilent website prior to Jul. 28, 2003.

* cited by examiner

*Primary Examiner*—Ricky Ngo
*Assistant Examiner*—Kan Yuen
(74) *Attorney, Agent, or Firm*—Volentine & Whitt, PLLC

(57) ABSTRACT

Network analyzers (NAs) monitor respectively corresponding communication lines through which Voice over Internet Protocol (VOIP) data streams are transmitted. A network troubleshooting center (NTC) communicates with the NAs to provide quality of service statistics for data streams transmitted through the communication lines and associated with a respective telephone call.

12 Claims, 3 Drawing Sheets

TROUBLESHOOTING A SPECIFIC VOICE OVER INTERNET PROTOCOL (VOIP) TELEPHONE CALL TRANSMITTED OVER A COMMUNICATIONS NETWORK

CROSS-REFERENCE TO RELATED APPLICATIONS

U.S. patent application Ser. No. 10/225,179, filed Aug. 22, 2002, titled "MONITORING AN RTP DATA STREAM BASED ON A PHONE CALL", inventors Bennett et al., is incorporated herein by reference in its entirety.

BACKGROUND OF THE INVENTION

1. Field of the Invention

The present invention relates to troubleshooting a specific Voice over Internet Protocol (VOIP) telephone call transmitted over a communications network. More specifically, the present invention relates to communications between a network troubleshooting center (NTC) and network analyzers (NAs) to provide quality of service statistics for data streams transmitted through a communications network and associated with a respective VOIP telephone call.

2. Description of the Related Art

When an end user of a Voice over Internet Protocol (VOIP) telephone is having a Quality of Service (QoS) problem with the VOIP telephone, the end user contacts a network operator and describes the problem.

The network operator needs to be able to find the cause of the problem from many, potentially thousands, of telephone calls going through many different nodes of a communications network through which the telephone calls are transmitted.

SUMMARY OF THE INVENTION

The present invention provides a network operator with the capability to monitor data streams for a respective VOIP telephone call of many VOIP telephone calls transmitted through a communications network, and thereby allows the network operator to obtain QoS statistics for the respective VOIP telephone call.

Additional aspects of the invention will be set forth in part in the description which follows and, in part, will be obvious from the description, or may be learned by practice of the invention.

The present invention provides a method including communicating between a network troubleshooting center (NTC) and network analyzers (NAs) monitoring respectively corresponding communication lines through which Voice over Internet Protocol (VOIP) data streams are transmitted, to provide quality of service statistics for data streams transmitted through the communication lines and associated with a respective telephone call.

The present invention also provides a method including (a) transmitting information indicating a respective telephone number from a network troubleshooting center (NTC) to network analyzers (NAs) monitoring respectively corresponding communication lines through which Voice over Internet Protocol (VOIP) data streams are transmitted; (b) after receipt of the transmitted information, monitoring call control information by each NA on the corresponding communication line in accordance with the received information to try to identify a data stream associated with a telephone call having the telephone number as a source or destination; (c) transmitting, by a first NA of the NAs to identify a data stream, identifying information of the identified data stream to the NTC; (d) after receipt of the transmitted identifying information, transmitting a message from the NTC to the NAs to cause the NAs to stop trying to identify a data stream associated with the telephone call, and providing the identifying information to the NAs; and, (e) after receipt of the message from the NTC, and in accordance with the identifying information provided by the received message, collecting quality of service data by the NAs for data streams associated with the telephone call and transmitted through the communication lines, and providing quality of service information by the NAs to the NTC based on the collected quality of service data.

Further, the present invention provide an apparatus including network analyzers (NAs) and a network troubleshooting center (NTC). The NAs monitor respectively corresponding communication lines through which Voice over Internet Protocol (VOIP) data streams are transmitted. The NTC communicates with the NAs to provide quality of service statistics for data streams transmitted through the communication lines and associated with a respective telephone call.

BRIEF DESCRIPTION OF THE DRAWINGS

The above and other advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
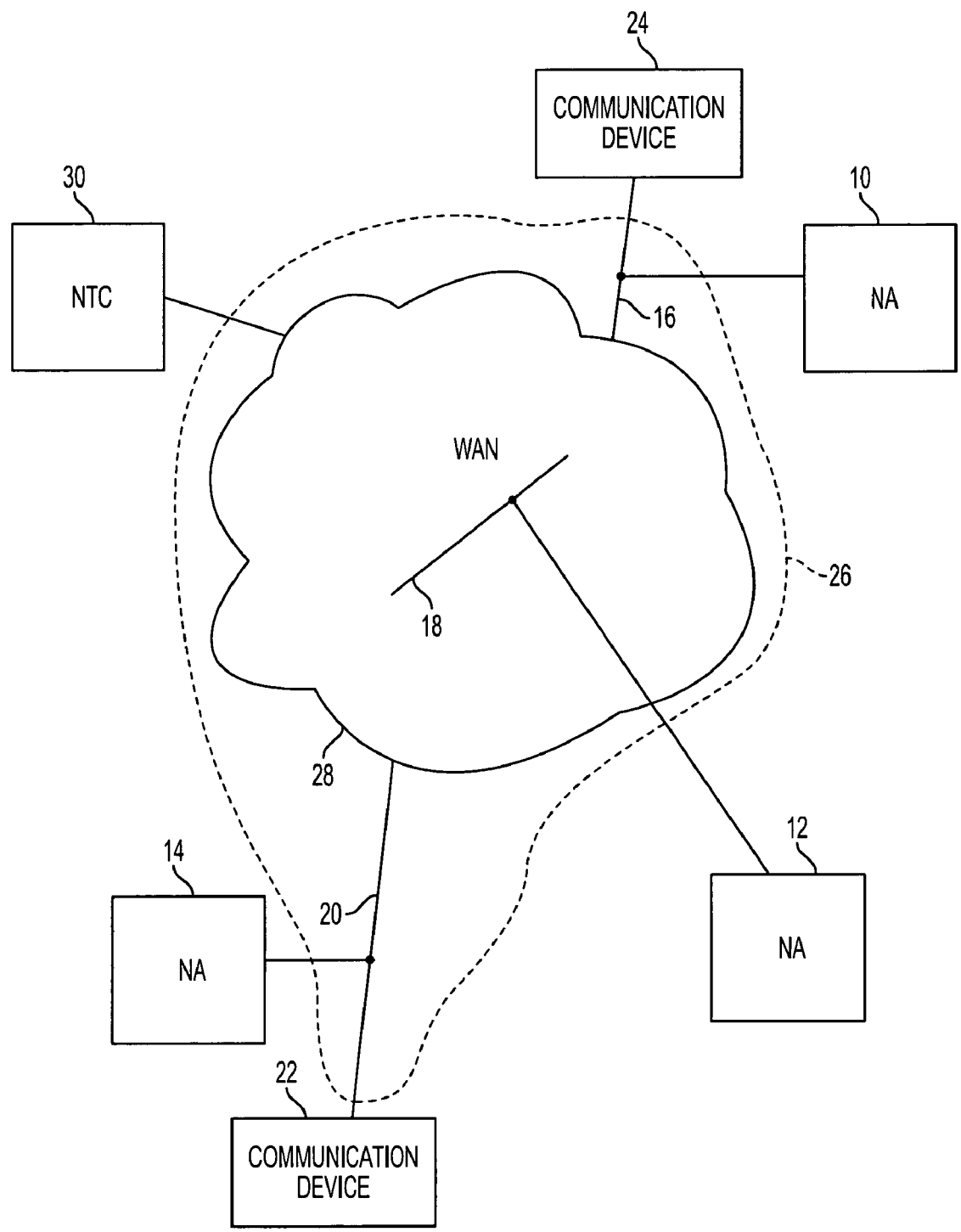
FIG. 1 is a diagram illustrating a system for troubleshooting a specific VOIP telephone call over a network, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating a system for troubleshooting a specific Voice over Internet Protocol (VOIP) telephone call over a network, according to an embodiment of the present invention. Referring now to FIG. 1, network analyzers (NAs) 10, 12 and 14 monitor communication lines 16, 18 and 20, respectively. VOIP telephone calls and their associated data streams are transmitted through communication lines 16, 18 and 20.

Such VOIP telephone calls are made, for example, by communication devices 22 and 24 through communication network 26. Communication devices might be, for example, VOIP telephones, fax machines, computers or even conventional telephones. However, the present invention is not limited to communication devices being any particular type of device, and relates, generally, to any communication device that can make or receive a telephone call of which at least a portion of the telephone call is transmitted in VOIP format. For example, a conventional circuit-switched telephone call might originate on a conventional telephone, but at least a portion of the call might be converted into a VOIP format and transmitted over a VOIP communications network. Moreover, although FIG. 1 shows only two communication devices 22 and 24, the present invention is not limited to any particular number of communication devices.

In FIG. 1, communication network 26 includes communication lines 16, 18 and 20, and also includes a wide area network (WAN) 28. Communication line 18 is shown inside WAN 28 and, of course, would be connected to other communication lines inside WAN 28 which are not shown in FIG. 1. Communication network 28 is only an example, and the present invention is not limited to this specific example. Instead, communication network 28 could be, or include, virtually any type of network through which VOIP telephone calls are transmitted. Communication network 28 could be, or include, the Internet.

In FIG. 1, a network troubleshooting center (NTC) 30 communicates with NAs 10, 12 and 14 to provide quality of service statistics for data streams transmitted through the communication lines and associated with a respective telephone call.

In FIG. 1, NTC 30 and NAs 10, 12 and 14 might communicate with each other through communications network 26, or might communicate with each other through a separate communications network (not illustrated). There are many manners in which NTC 30 and NAs 10, 12 and 14 can communicate with each other, and the present invention is not limited to any particular manner.

The system in FIG. 1 is only intended as an example configuration, and the present invention is not limited to this configuration.

Figure 2:
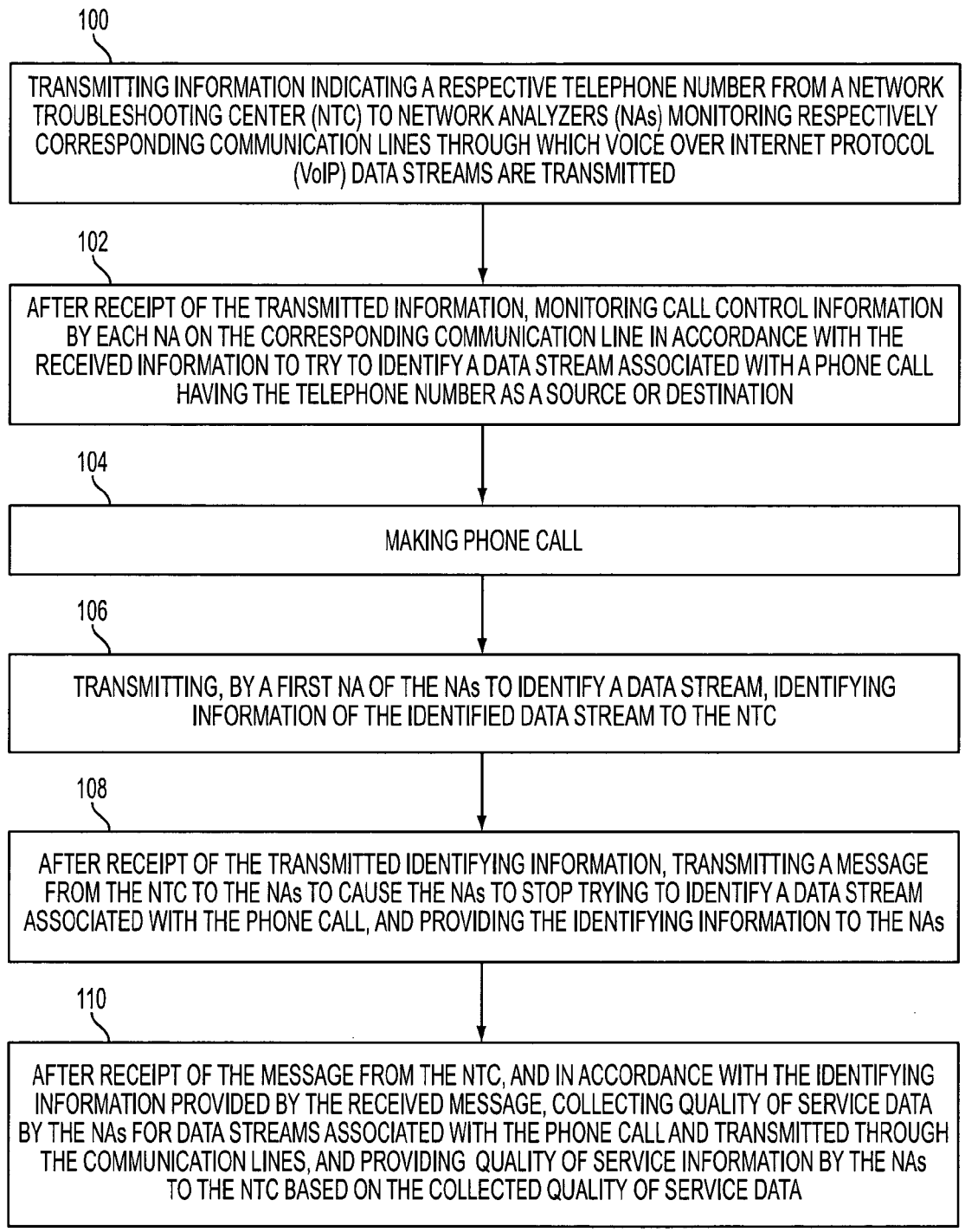
FIG. 2 is a diagram illustrating a communication process between an NTC and NAs in FIG. 1, according to an embodiment of the present invention.

FIG. 2 is a diagram illustrating a communication process between NTC 30 and NAs 10, 12 and 14 in FIG. 1, according to an embodiment of the present invention. Referring now to FIG. 2, in operation 100, NTC 30 transmits information indicating a respective telephone number to NAs 10, 12 and 14 monitoring respectively corresponding communication lines 16, 18 and 20 through which VOIP data streams are transmitted. There are many different manners of transmitting information indicating a respective telephone number to NAs, and the present invention is not limited to any particular manner.

In some embodiments, in operation 100, before transmitting information to NAs 10, 12 and 14, NTC 30 might first select which of NAs 10, 12 and 14 will be involved in the process. For example, with a relatively small communication network, all NAs connected to communication lines might be involved in the process, so that no selection would be required. However, if the communication network is large, only some of the NAs connected to communication lines might be involved in the process. In such a case, in operation 100, NTC 30 can determine which communication lines would likely be involved in transmitting a respective telephone call, and only select NAs monitoring those lines. As an example, if a telephone call from Chicago is to be monitored over a very large network with connections to many cities such as Chicago, New York and Tokyo, only NAs connected to appropriate communication lines involved in telephone calls from/to Chicago would be selected by NTC 30 to be involved in the process. NAs monitoring communication lines in Tokyo might not be selected by NTC 30.

From operation 100, the process moves to operation 102, where, after receipt of the transmitted information from NTC 30, each NA 10, 12 and 14 monitors call control information on the corresponding communication line 16, 18 or 12 in accordance with the received information to try to identify a data stream associated with a telephone call having the telephone number as a source or destination. As an example, each NA 10, 12 and 14 monitors call control information in accordance with a monitoring process as described, for example, in U.S. patent application Ser. No. 10/225,179, filed Aug. 22, 2002, titled "MONITORING AN RTP DATA STREAM BASED ON A PHONE CALL", Inventors Bennett et al., and which is incorporated herein by reference in its entirety. However, the present invention is not limited to monitoring the call control information in this particular manner, and other manners of monitoring the call control information can be used.

From operation 102, the process moves to operation 104, where an end user makes a telephone call from a telephone having the respective telephone number, or makes a telephone call to a telephone having the respective telephone number. Moreover, the present invention is not limited to the telephone call being made by an end user. In some embodiments, for example, a computer might be directed to make the telephone call. To ensure that NAs 10, 12 and 14 can detect the call control information, the telephone call in operation 104 should be made after NAs 10, 12 and 14 have begun monitoring communication lines 16, 18 and 20 for the call control information.

From operation 104, the process moves to operation 106, where a first NA of NAs 10, 12 and 14 to identify a data stream transmits identifying information of the identified data stream to NTC 30. There are many different types of appropriate identifying information which can be used. As an example, if the data streams are Real-time Transmission Protocol (RTP) data streams, each RTP data stream will have its own unique identifying information, such as IP source and destination addresses, UDP port numbers, SSRC number, etc. Such information might be used as the identifying information. However, the present invention is not limited to any particular type of identifying information or to any particular protocols.

From operation 106, the process moves to operation 108, where, after receipt of the transmitted identifying information, NTC 30 transmits a message to NAs 10, 12 and 14 to cause NAs 10, 12 and 14 to stop trying to identify a data stream associated with the telephone call, and to provide the identifying information to NAs 10, 12 and 14. Here, NTC 30 transmits the message to each NA involved in the process. In other embodiments, the first NA to identify a data stream might automatically stop trying to further identify data streams, and NTC might simply send a message to all the NAs involved in the process other than the first NA. There are many different manners in which NAs can be informed to stop trying to identify a data stream, and the present invention is not limited to any particular manner.

From operation 108, the process moves to operation 110 where, after receipt of the message from NTC 30, and in accordance with the identifying information provided by the received message, NAs 10, 12 and 14 collect quality of service data for data streams associated with the telephone call and transmitted through communication lines 16, 18 and 20. NAs 10, 12 and 14 provide quality of service information to NTC 30 based on the collected quality of service data. It is well-known how to collect quality of service data for a data stream by an NA. It is also well known how to provide quality of service information based on collected quality of service data by an NA. Moreover, the present invention is not limited to any particular manner of collecting quality of service data, to any particular manner of providing quality of service information, or to any particular types of quality of service data or quality of service information.

The communication process in FIG. 2 is only intended as an example process, and the present invention is not limited to this specific example. For example, the order of some of the operations might possibly be changed, additional operations might be added, or some of the operations might be eliminated.

Figure 3:
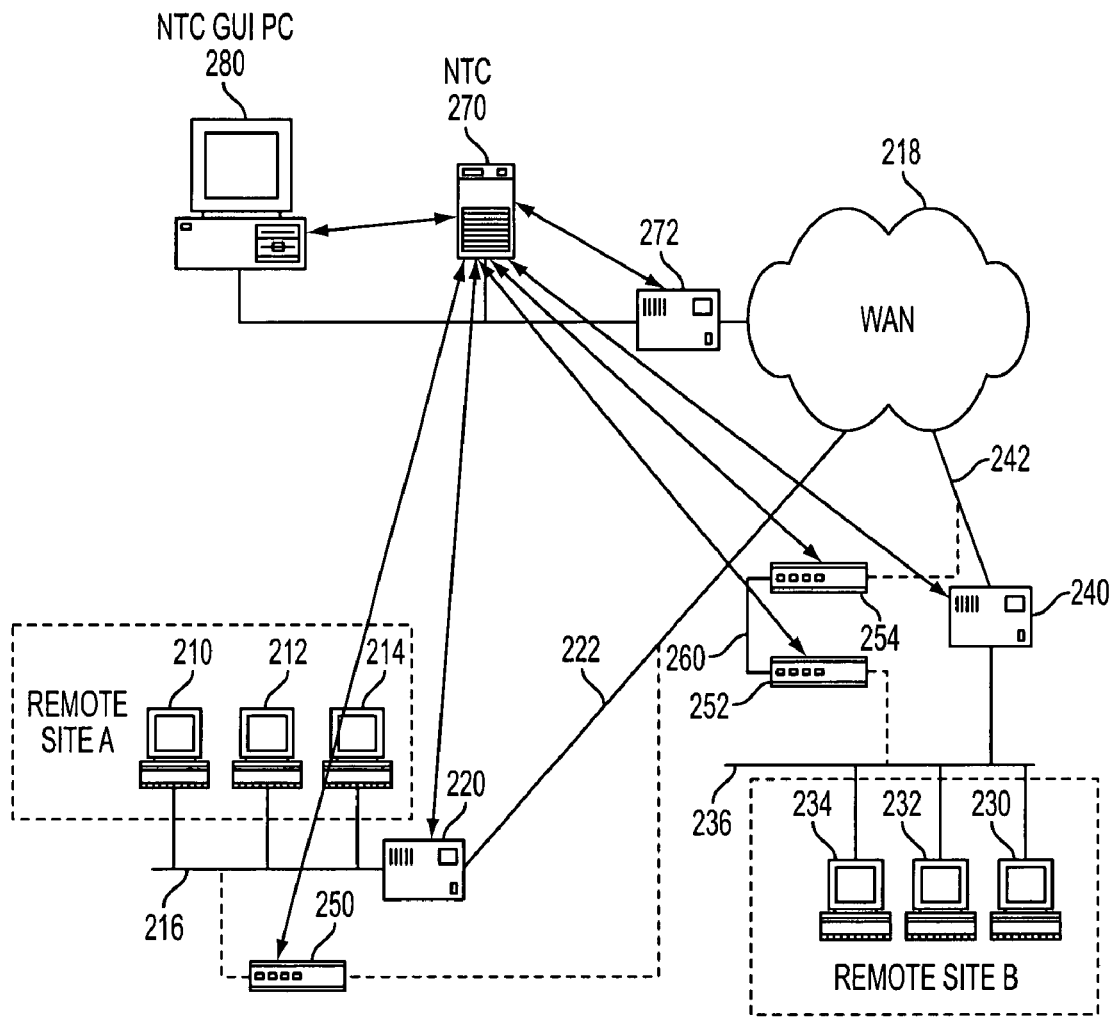
FIG. 3 is a diagram illustrating an example of a system for troubleshooting a specific VOIP telephone call over a network, according to an additional embodiment of the present invention.

FIG. 3 is a diagram illustrating an example of a system for troubleshooting a specific VOIP telephone call over a network, according to an additional embodiment of the present invention. FIG. 3 is a more detailed example than that in FIG. 1.

Referring now to FIG. 3, remote site A includes communication devices 210, 212 and 214 connected to a communication line 216. In this specific example, communication devices 210, 212 and 214 are personal computers (PCs). Communication line 216 is connected to a wide area network (WAN) 218 via a router 220. A communication line 222 connects router 220 to WAN 218.

Remote site B includes communication devices 230, 232 and 234 connected to a communication line 236. In this specific example, communication devices 230, 232 and 234 are personal computers (PCs). Communication line 236 is connected to WAN 218 via a router 240. A communication line 242 connects router 240 to WAN 218.

VOIP telephone calls can be made to/from communication devices 210, 212, 214, 230, 232 and 234 through WAN 218 and communication lines 216, 222, 236 and 242.

NA 250 monitors communication line 216 and, in this example, also monitors communication line 222. A NA 252 monitors communication line 236. A NA 254 monitors communication line 242. In this specific example, NAs 252 and 254 are connected by a direct communication link 260 to directly communication with each other.

There are many different types, manufactures and models of NAs that can be used as NAs 250, 252 and 254. NAs 250, 252 and 254 might each be the same type, manufacture and model number, or might be different from each other. As an example, NA 250 might be an Agilent Network Analyzer (NA), NA 252 might be an Agilent Conerstone Distributed Network Analyzer (DNA-MX) and NA 254 might be an Agilent Distributed Network Analyzer (DNA). However, the present invention is not limited to any specific type, manufacture or model of NA.

A network troubleshooting center (NTC) 270 communications with NAs 250, 252 and 254 to monitor communication lines 216, 222, 236, and 242 through which VOIP data streams are transmitted, to provide quality of service statistics for data streams transmitted through communication lines 216, 222, 236, and 242 and associated with a respective telephone call.

In the example of FIG. 3, a network troubleshooting center graphical user interface personal computer (NTC GUI PC) 280 provides a GUI through which an operator interacts with NTC 270. NTC GUI PC 280 is connected to WAN 218 through a router 272. However, the present invention is not limited to the use of a NTC GUI PC to interface with a NTC.

In FIG. 3, as an example, when an operator presses a "START TEST" button (not illustrated) on NTC GUI PC 280, NTC 270 sends, for example, an XML command to each NA of Nas 250, 252 and 254 selected by NTC 270 for the test. In this example, it will be assumed that each NA 250, 252 and 254 was selected for the test. The XML command will provide an operator specified phone number to each NA 250, 252 and 254. Upon receipt of the XML command, each NA 250, 252 and 254 will monitor call control information on the corresponding communication line(s) of communication lines 216, 222, 236 and 242 to try and identify a data stream associated with a telephone call having the operator specified phone number as a source or a destination. This will cause one or more of NAs 250, 252 and 254 to identify a data stream associated with the telephone call.

Once a respective NA of NAs 250, 252 and 254 has identified a data stream(s), the respective NA transmits an XML message back to NTC 270 informing NTC 270 which data stream(s) is associated with the telephone call. NTC 270 then transmits an XML message to NAs 250, 252 and 254 informing them of the data stream(s) to be monitored. Each NA 250, 252 and 254 will then begin monitoring the identified data stream(s) associated with the telephone call. Each NA 250, 252 and 254 will collect quality of service data for the data stream(s) associated with the telephone call, and provide quality of service information to NTC 270 based on the collected quality of service data.

Therefore, with the system in FIG. 3, NAs 250, 252 and 254 are placed at various positions throughout a communications network NAs 250, 252 and 254 are then controlled by NTC 270 via NTC GUI PC 280. Via NTC GUI PC 280, an operator can, for example, select an option which will enable troubleshooting a specific VOIP telephone call over a communications network. Via NTC GUI PC 280, the operation will simply need to supply a phone number of a telephone for which VOIP data streams will be monitored.

In FIG. 3, NTC 270 is shown as directly communicating with NAs 250, 252 and 254, and also with NTC GUI PC 280 and routers 220 240 and 272. Alternatively, as an example, NTC 270 might communicate with NAs 250, 252 and 254, and also with NTC GUI PC 280 and routers 220 240 and 272, through WAN 218 and communication lines 216, 222, 236 and 242. There are many manners in which such devices might communicate with each other, and the present invention is not limited to any particular manner.

The system in FIG. 3 is only intended as an example configuration, and the present invention is not limited to this configuration.

Further, the example in FIG. 3 is described as transmitting messages in "XML". However, the present invention is not limited to any particular protocols.

As indicated above, if the communication network is large, only some of the NAs connected to communication lines might be involved in troubleshooting a specific VOIP telephone call. In such a case, an NTC can determine which communication lines would likely be involved in transmitting a respective telephone call, and only select NAs monitoring those lines. In such cases, it is possible that some packets might pass through communication lines that an NA is not monitoring. However, with an appropriate selection of NAs by an NTC, hopefully these packets will be detected when they pass on other communication lines that are being monitored by a NA. It is important for an NTC to select appropriate NAs or, if possible, select all the NAs, since it is not known which communication lines the call control information will be transmitted through. Therefore, appropriate NAs must be selected so that the call control information can be monitored.

It is not necessary for the call control information to propagate through every NA in the network, as long as one of the NAs monitors the call control setup from the call control information. Then, the first NA that discovers the call control information should be able to provide the necessary data stream information to monitor the specific VOIP call to the other NAs via the NTC.

The present invention relates to VOIP telephone calls being made over a communications network. Such calls typically initiate, commence, and terminate communication, for example, via a Session Initialization Protocol (SIP). Thus, call control information monitored by a NA would typically be SIP. More specifically, the NA would monitor SIP signaling packets for initiating, commencing and terminating VOIP calls. SIP and monitoring SIP call control information is well-known. However, there are many different protocols for VOIP telephone calls, and the present invention is not limited to SIP to or any other protocol.

Further, with a VOIP telephone calls, the associated data streams are typically Real-time Transmission Protocol (RTP) data streams. However, there are many different protocols for VOIP communications, and the present invention is not limited to data streams being RTP or to any particular protocol.

As an example of the present invention, if the data streams are RTP data streams, each NA would monitor the RTP data streams, and collect quality of service data from the monitored RTP data streams. Each NA would then provide quality of service information to the NTC based on the collected quality of service data. The quality of service information provided to the NTC by each NA might include, for example, a MOS score or information on, for example, packet jitter, packet loss, etc. MOS scores, packet jitter, packet loss are well-known types of quality of service information. However, the present invention is not limited to any particular quality of service information.

According to embodiments of the present invention, via, for example, a NTC GUI PC, an operator can view the voice quality of a respective telephone call as seen by each NA selected by the NTC.

The present invention provides a powerful approach for monitoring a respective VOIP telephone call. More specifically, with the present invention, any one of the NAs selected by the NTC can find a proper data stream associated with a respective call. By distributing information which identifies the data stream to the other NAs via the NTC, a network picture of the telephone call can be achieved.

There are many ways in which an NTC can present the quality of service data to an operator. For example, color indicators are typically used by an NTC to present quality of service data to an operator. For example, some of the NAs will be presented to the operator by the NTC as network nodes in the color "green", indicating that the voice quality is good. Any nodes that show up as "yellow" or "red" will indicate degraded voice quality (QoS) and can be investigated further. However, the present invention is not limited to any particular manner of presenting quality of service data to an operator.

A respective VOIP telephone call might have a plurality of associated data streams. The present invention can be used to monitor each of the associated data streams, or only a respective data stream of the plurality of associated data streams.

The present invention relates to the use of NAs and NTCs, which are known devices. For example, NAs might be, for example, the Agilent Network Analyzer (NA), the Agilent Distributed Network Analyzer (DNA), the Agilent Cornerstone (DNA-MX), the Agilent Sandstone (DNA-ME) and/or the Agilent Software Network Analyzer (SW-NA). A NTC might be, for example, an Agilent Network Troubleshooting Center (NTC).

The present invention relates to troubleshooting a specific VOIP telephone call over a communications network. However, the present invention is not limited to "troubleshooting". In other words, the present invention can be used to simply monitor quality of a specific VOIP telephone call, even though no quality problem had yet been noticed with the respective telephone making or receiving calls.

The present invention relates to VOIP telephone calls. A VOIP telephone call occurs, for example, when a telephone call originates as a VOIP telephone call from, for example, a VOIP telephone, or when a traditional "circuit switched" telephone call is converted into a VOIP telephone call. Therefore, the present invention is applicable as long as a portion of the telephone call is in VOIP format while traveling over communication lines monitored by NAs.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising: transmitting a respective telephone number from a network troubleshooting center (NTC) to a plurality of network analyzers (NAs) monitoring respectively corresponding communication lines through which Voice over Internet Protocol (VoIP) data streams are transmitted; and after receiving the telephone number, collecting quality of service data by the NAs for data streams associated with a telephone call having the telephone number as a source or destination and transmitted through the communication lines, and providing quality of service information by the NAs to the NTC based on the collected quality of service data;

before the step of collecting the quality of service data:

after receipt of the telephone number by each NA, monitoring call control information by each NA on the corresponding communication line in accordance with the telephone number to try to identify a data stream associated with a telephone call having the telephone number as a source or destination;

transmitting, by a first NA of the NAs to identify the data stream, identifying information of the identified data stream to the NTC;

after receipt of the transmitted identifying information, communicating between the NTC and the NAs so that each NA has the identifying information; and sending a message from the NTC to the NAs to cause the NAs to stop trying to identify a data stream associated with the telephone call.

2. A method as in claim 1, wherein the telephone call is based on Session Initialization Protocol (SIP).

3. The method of claim 1, wherein the telephone call is based on Session Initialization Protocol (SIP).

4. The method of claim 1, further comprising prior to transmitting the respective telephone number from the NTC to the plurality of NAs, the NTC selecting the plurality NAs from among a larger superset of NAs and not transmitting the respective telephone number from the NTC to NAs of the superset that are not selected.

5. The method of claim 4, wherein the NTC selects from the superset NAs which monitor lines associated with the telephone number, and does not select from the superset NAs which do not monitor lines associated with the telephone number.

6. A method comprising: transmitting a respective telephone number from a network troubleshooting center (NTC) to network analyzers (NAs) monitoring respectively corresponding communication lines through which Voice over Internet Protocol (VoIP) data streams are transmitted;

after receipt of the telephone number, monitoring call control information by each NA on the corresponding communication line in accordance with the received information to try to identify a data stream associated with a telephone call having the telephone number as a source or destination;

transmitting, by a first NA of the NAs to identify a data stream, identifying information of the identified data stream to the NTC;

after receipt of the transmitted identifying information, transmitting a message from the NTC to the NAs to cause the NAs to stop trying to identify a data stream associated with the telephone call, and providing the identifying information to the NAs; and after receipt of the message from the NTC, and in accordance with the identifying information provided by the received message, collecting quality of service data by the NAs for data streams associated with the telephone call and transmitted through the communication lines, and providing quality of service information by the NAs to the NTC based on the collected quality of service data.

7. A method as in claim 6, wherein the telephone call is based on Session Initialization Protocol (SIP).

8. An apparatus comprising: a network troubleshooting center (NTC) for transmitting a telephone number; and a plurality of network analyzers (NAs) for monitoring respectively corresponding communication lines through which Voice over Internet Protocol (VoIP) data streams are transmitted, wherein, after receiving the telephone number, the NAs collect quality of service data for data streams associated with a telephone call having the telephone number as a source or destination and transmitted through the communication lines, and provide quality of service information to the NTC based on the collected quality of service data;

wherein the NTC transmits a respective telephone number to the NAs; after receipt of the transmitted information, each NA monitors call control information on the corresponding communication line in accordance with the received information;

a first NA of the NAs to identify a data stream associated with a telephone call having the telephone number as a source or destination transmits identifying information of the identified data stream to the NTC;

after receipt of the transmitted identifying information, the NTC communicates with the NAs so that each NA has the identifying information; and sending a message from the NTC to the NAs to cause the NAs to stop trying to identify a data stream associated with the telephone call.

9. A method as in claim 8, wherein the telephone call is based on Session Initialization Protocol (SIP).

10. The apparatus of claim 8, wherein the telephone call is based on Session Initialization Protocol (SIP).

11. An apparatus comprising: means for transmitting a respective telephone number from a network troubleshooting center (NTC) to network analyzers (NAs) monitoring respectively corresponding communication lines through which Voice over Internet Protocol (VoIP) data streams are transmitted;

means for, after receipt of the telephone number, monitoring call control information by each NA on the corresponding communication line in accordance with the received information;

means for transmitting, by a first NA of the NAs to identify a data stream associated with a telephone call having the telephone number as a source or destination, identifying information of the identified data stream to the NTC;

means for, after receipt of the transmitted identifying information, transmitting a message from the NTC to the NAs to cause the NAs to stop trying to identify data stream associated with the telephone call, and providing the identifying information to the NAs; and means for, after receipt of the message from the NTC, and in accordance with the identifying information provided by the received message, collecting quality of service data by the NAs for data streams associated with the telephone call and transmitted through the communication lines, and providing quality of service information by the NAs to the NTC based on the collected quality of service data.

12. An apparatus as in claim 11, wherein the telephone call is based on Session Initialization Protocol (SIP).

* * * * *